Patented Apr. 7, 1953

2,634,206

UNITED STATES PATENT OFFICE 2,634,206

STEEL ALLOY

Robert L. Baldwin, Bridgeport, Conn., assignor to The Stanley Works, New Britain, Conn., a corporation of Connecticut No Drawing. Application January 30, 1951, Serial No. 208,666

4 Claims. (Cl. 75—126)

This invention relates generally to steel alloys and has particular relation to steel alloys for use in cutlery; such as band saws and knives and especially for use in razor blades. The present application is a continuation-in-part of my copending application S. N. 171,564, filed June 30, 1950, now abandoned, for "Steel Alloy."

In the manufacture of cutlery, particularly razor blades, it is desired to utilize a steel which can be honed and otherwise treated to produce a sharp edge and which will retain this edge in use over long periods of time.

It is an object of the present invention to provide a steel alloy for this purpose which can be utilized to produce an edge which is sharper than that previously considered possible, or conversely, one which can be utilized to attain a satisfactory keen edge of standard quality with less processing than would be required for prior steels or steel alloys, thus effecting a saving in time and cost of manufacture.

It is a further object of the invention to provide such an alloy which will produce the sharpest edge possible and which at the same time will have good wearing qualities, will not crumble and will possess the desired requirements of hardness, resistance to abrasion, and the ability in general to hold a keen edge.

In the prior manufacture of cutlery, particularly razor blades, it has been found generally that an improvement in one or more of the many desirable characteristics of the steel alloy results in degradation of one or more of the other desirable characteristics. Accordingly, it is a further object of the present invention to provide a novel steel alloy which will have a high tensile strength without resulting in an undesirable decrease in ductility. Another object is to provide such a steel alloy which will have a greater permissible range of hardness without lowering its good cutlery characteristics. Still another object is to provide such a steel alloy which will have high hardness characteristics without resulting in undesirable brittleness. Still another object is to provide such a steel alloy which will have substantially all the desired characteristics, including fine grain, low brittleness, high workability, high hardness, high honability and grindability, high cutting ability, and the desired tensile strength, elastic limit and elongation.

A still further object of the invention is to provide such a steel alloy which will have the aforementioned characteristics when used in the form of razor blades reduced in final thickness by as much as 50% less (.003 inch) than the thickness of conventional double edge blades (.006 inch). Still another object is to provide such an alloy steel which will have the aforementioned characteristics and yet will retain its flexibility and low brittleness so as to permit being tightly wound in the form of a coil without breakage.

A further object of the invention is to provide such an alloy steel which will retain the aforementioned characteristics and yet be capable of undergoing long annealing periods of about 25 to 30 hours in the manufacture of razor blades.

A still further object of the invention is to provide such a steel alloy which will permit welding of the free ends with air cooling when in the form of a band saw strip.

These and other objects of the present invention will be better understood by reference to the following description.

The present invention resides in the discovery that a surprisingly superior steel alloy for cutlery purposes, and particularly for use in razor blades and band saws, can be obtained by forming a steel alloy having the following composition:

|  | Per cent |
|---|---|
| Carbon | from 1.35 to 1.50 |
| Chromium | from .70 to 1.00 |
| Vanadium | from .30 to .45 |
| Silicon | from .20 to .50 |
| Manganese | from .25 to .40 |
| Phosphorus | .020 max. |
| Sulphur | .020 max. |

And the remainder iron and incidental impurities.

The amounts of phosphorus and sulphur present are specified above merely for completeness, it being apparent that the amounts of these elements normally are present in the ranges set forth in most steels as incidental impurities. The combined total amount of these latter elements, in general, will be well under one per cent.

The manganese component is present in conventional amounts used in razor blade steels for the conventional purposes as a cleanser and deoxidizer and to counteract the harmful effects of the sulphur. It has been found that small amounts of manganese in the range of 0.15 to 0.30 per cent are satisfactory in the present alloy for the manufacture of band saws.

Chromium is generally used in amounts of about 0.15 to 0.25% in conventional razor blade steels which have a carbon content of about 1.20 to 1.30 per cent, although higher chromium ranges of the order of 0.40 to 0.50 per cent have been used. However, it is known that further increases in the chromium content would cause such blades to be more difficult to grind and hone. The specified chromium content primarily improves the hardness of the present alloy. Additionally, chromium partially dissolves in the iron and partially forms carbides, thereby tending to give the increased hardness desired for better wear resistance while at the same time retaining the desired toughness. Hardness of chromium steels is due to the formation of chromium carbides or chromium-iron carbides which are intensely hard. For band saw use, it has been found more satisfactory to stay in the lower limit of the chromium content since this results in better welding characteristics, especially with air cooling. Thus, for band saw steel alloys, a chromium content as low as 0.60-0.80 per cent is preferred. Although this reduced percentage does lower the hardness to some extent, this is more than offset by the improved welding characteristics obtainable.

Vanadium is generally not used in conventional razor blade steels. In the present alloy, it has been observed that the vanadium in about the stated range intensifies the effect of the chromium and tends to keep down the grain size; that is, it promotes fine grain formation. Moreover, it has been found that the combination of chromium and vanadium increases strength and hardenability while retaining toughness and fine grain. The specified vanadium content has also been found to minimize the danger of brittleness and tends to retard graphitizing, especially in the manufacture of razor blades involving long anneals of the order of 25 to 30 hours where the carbon may revert to graphite during a succession of two or three anneals. The vanadium content specified has also been found to promote the formation of carbides. The vanadium content may be somewhat increased, say up to 0.50 per cent without adverse effect on the alloy characteristics. However, it is one of the most expensive components and is therefore generally used in the minimum effective amounts.

Silicon is normally considered as a deoxidizer and it is common practice to add incidental amounts in an alloy steel which is to be heat treated. Also, the addition of the specified amounts of silicon is believed to increase the tensile strength without resulting in a material decrease in ductility. It appears that the silicon dissolves in the ferrite. The addition of the specified percentages of silicon is believed to be in part responsible for the increases in hardness which have been obtained with the present high carbon steel. I have also found, contrary to expectations, that the high silicon content in the combination of the present alloy did not increase the brittleness after hardening and furthermore did not result in the formation of graphite after long anneals.

The carbon content of conventional razor blade steels generally is 1.20 to 1.30 per cent and is generally 1.20 to 1.35 per cent for band saw steels. It will be apparent that the steel alloy of the present invention utilizes a comparatively high carbon content which would be expected to reduce the workability of a steel alloy and make it difficult to roll. However, the present alloy is unusual in this respect in that it has been found to be at least as or more workable than a similar alloy with a lower carbon content of the order of 1.20 to 1.30 per cent. It is believed that the combination of the specified amounts of chromium, vanadium, and silicon contents in the present alloy unexpectedly results in improved workability for the higher carbon steel. It is also believed that the higher carbon in combination with the specified chromium, vanadium and silicon results in a better combination of hardness, resistance to abrasion, and the ability to hold a keen edge together with unusual combinations of toughness and cutting ability.

The present invention is characterized in the provision of relatively low chromium content and a comparatively high ratio of carbon to chromium and a comparatively low ratio of chromium to silicon in a high carbon steel having a relatively high silicon content. Thus, the present invention is characterized in the provision of the specified additions of alloys in the form of silicon, chromium, and vanadium to an exceptionally high carbon steel resulting in a desirable increase in strength, hardness and wear-resistance without serious loss in ductility and at the same time avoiding undue brittleness after heat-treatment of their stock such as used for razor blades or band saws.

The steel alloy of the present invention can be made in accordance with the conventional practice for forming a multiple steel alloy such as, for example, by blending the elements in an electric furnace or in an open hearth furnace, the various elements being added either to the bath or in the ladle.

When the alloy of the present invention is produced in any desired manner and containing the elements mentioned in the range specified, it may be hot and cold rolled to the form desired for use in cutlery products. In the manufacture of conventional razor blades, for example, it is customary to hot roll the steel in ribbon form to a thickness of approximately .066" and to cold roll the strip thereafter to a final thickness desired, generally of the order of .006". The steel may be annealed between cold rollings in the usual manner to relieve stresses.

After rolling, the steel alloy of the present invention preferably is hardened and tempered following conventional practices to obtain the desired final mechanical properties. It is an advantage of the steel alloy of the present invention, however, that a greater range of hardness may be attained without loss of toughness or resistance to abrasion and without acquiring brittleness. As a result, the steel alloy of the invention can be made harder than steels and steel alloys heretofore used for cutlery purposes and at the same time, the final product can be honed to a keener edge, there being no difficulty from the standpoint of crumbling, etc., which normally interferes with the honing of hard steels. Also, the resulting keen edge will not be brittle or lacking in sufficient toughness or plasticity to wear well and thus will retain its sharpness in use.

Microscopic examination of a steel alloy made in accordance with the present invention after hardening and tempering shows that there is formed a large amount of carbides precipitated in the form of very fine, uniformly divided spheroids. This structure is beneficial for obtaining the good cutting edge and wear resistance referred to above.

The following examples are illustrative of the present steel alloy:

EXAMPLE 1

| | Per cent |
|---|---|
| Carbon | Approximately 1.38 |
| Chromium | Approximately 0.89 |
| Vanadium | Approximately 0.38 |
| Silicon | Approximately 0.50 |
| Manganese | Approximately 0.32 |

Remainder iron and incidental impurities.

This steel alloy was formed into an annealed, cold rolled strip in the dimensions of .037 x 3½", the Rockwell hardness test was 95/97 on the "B" scale, the tensile strength was 94,000 lbs./sq. in., and the elastic limit was 81,000 lbs./sq. in. The same alloy when formed into a strip of .881 x .006", suitable for manufacture of razor blades (not annealed) was found to have a Rockwell hardness value on the "30-T" scale of 85.2, and a tensile strength of 137,000 lbs./sq. in.

EXAMPLE 2

| | Per cent |
|---|---|
| Carbon | Approximately 1.38 |
| Chromium | Approximately 1.00 |
| Vanadium | Approximately 0.43 |
| Silicon | Approximately 0.21 |
| Manganese | Approximately 0.26 |

This steel alloy was hot rolled and batch annealed at 0.066 thickness; then rolled to 0.050 thickness and batch annealed; then rolled to 0.037 thickness and continuously annealed.

A conventional steel alloy for razor blade production having the following analysis was similarly treated:

*Conventional steel alloy*

| | |
|---|---|
| Carbon | Approximately 1.25 per cent |
| Chromium | Approximately 0.20 per cent |
| Manganese | Approximately 0.35 per cent |
| Silicon | Approximately 0.20 max. |
| Phosphorous | Approximately 0.020 max. |
| Sulfur | Approximately 0.020 max. |

Remainder iron with incidental impurities.

Comparative tests gave the following results:

| | Alloy of Example 2 | Conventional |
|---|---|---|
| Elastic Limit | 85,000 | 64,500 |
| Tensile strength | 97,000 | 84,400 |
| Percent elongation at 2 inches | 12 | 20 |
| Rockwell hardness | B 96/97 | B 89 |
| Tensile strength of finished strip (.881 x .006") | 138,000 | 129,000 |
| 30 T Rockwell hardness | 85.5 | 83.5 |

In the form of band saws 0.750 inch wide and .0320 inch thick (conventional steel alloy) and 0.030 thick (Example 2), cutting tests were run on a regulation test bar. The conventional steel alloy went out of line at 40 cuts and failed completely at 48 cuts. The alloy steel of Example 2 failed at 53 cuts, all of which were straight.

EXAMPLE 3

| | Per cent |
|---|---|
| Carbon | Approximately 1.35 |
| Chromium | Approximately 0.80 |
| Vanadium | Approximately 0.32 |
| Silicon | Approximately 0.27 |
| Manganese | Approximately 0.32 |

Remainder iron and incidental impurities.

This steel alloy and the conventional steel alloy set forth above were treated and tested as follows:

| | Example 3 | Conventional |
|---|---|---|
| (a) Hot rolled and one long batch anneal at .4 inches by 0.066 inch: | | |
| Elastic limit | 78,900 | 60,000 |
| Tensile strength | 107,200 | 93,000 |
| Percent elongation in 2 inches | 13 | 16 |
| Rockwell hardness | B 98/99 | B 94/95 |
| (b) The same steels were put through a continuous anneal and tested: | | |
| Elastic limit | 108,000 | 76,400 |
| Tensile strength | 142,000 | 116,200 |
| Percent elongation in 2 inches | 11 | 14 |
| Rockwell hardness | B 104/105 | B 98/99 |
| (c) The same steels after batch anneal at 0.066" were cold rolled to 0.050 inch and given a second batch anneal and tested: | | |
| Elastic limit | 93,600 | 55,700 |
| Tensile strength | 103,500 | 87,800 |
| Percent elongation in 2 inches | 15 | 19.5 |
| Rockwell hardness | B 100 | B 92 |
| (d) The same steels after batch rolled to 0.066" were cold rolled to 0.050" and annealed continuously and tested: | | |
| Elastic limit | 80,700 | 67,300 |
| Tensile strength | 110,200 | 98,400 |
| Percent elongation in 2 inches | 13 | 17 |
| Rockwell hardness | B 98/99 | B 92/93 |
| (e) The steel of Example 3 after batch anneal at .066 and continuous anneal at .050 was cold rolled to .037 and annealed continuously and tested: | | |
| Elastic limit | 85,600 | |
| Tensile strength | 106,000 | |
| Percent elongation in 2 inches | 9 | |
| Rockwell hardness | B 98/97 | |

Practical shaving tests were conducted with 203 adult men with one double edge razor blade each, made of the steel alloy of Example 1. The results of the survey were as follows:

| | |
|---|---|
| Reported excellent | 20 |
| Reported unusually good | 2 |
| Reported very good | 142 |
| Reported fine | 1 |
| Reported good | 28 |
| Requested new blades for further trial | 5 |
| Reported poor | 4 |

In all cases (4) where the blade was reported "poor" and where a new blade was requested for further trial (5), the new blade was reported as "very good."

In a further practical shaving test, 36 men using 4 double edge blades each on stubble of at least 36 hours growth, an average of 10.5 very good shaves per person per blade was found.

EXAMPLE 4

| | Per cent |
|---|---|
| Carbon | Approximately 1.41 |
| Chromium | Approximately 0.88 |
| Vanadium | Approximately 0.36 |
| Silicon | Approximately 0.51 |
| Manganese | Approximately 0.33 |

Treatment and test results were generally similar to those of the steel alloy of Example 1, with the following general variations:

Tensile strength of finished strip 138,500 (.881 x .006").
30 T Rockwell hardness _____ 85.5

EXAMPLE 5

| | Per cent |
|---|---|
| Carbon | Approximately 1.36 |
| Chromium | Approximately 0.90 |
| Vanadium | Approximately 0.40 |
| Silicon | Approximately 0.49 |
| Manganese | Approximately 0.32 |

Remainder iron and incidental impurities.

This steel alloy was treated and tested generally similar to Example 1 with the following general variations:

Tensile strength of finished strip 135,000 (.881 x .065").
30 T Rockwell hardness _____ 84.5

EXAMPLE 6

| | Per cent |
|---|---|
| Carbon | Approximately 1.48 |
| Chromium | Approximately 0.70 |
| Vanadium | Approximately 0.32 |
| Silicon | Approximately 0.21 |
| Manganese | Approximately 0.37 |

Remainder iron and incidental impurities.

This steel alloy when treated like Example 2 will test about the same with the exception that the hardness will be reduced to about B 94/95. This alloy when used in the production of a band saw as in Example 2 may be readily welded with air cooling.

Razor blade strips made in accordance with the present invention, when hardened, tempered and honed by conventional methods, result in an unexpected improvement in the sharpness which can be produced, which renders the blade greatly superior to those now commercially available. As a result of the improved structure of the metal as well as its toughness and other properties, the edge is not destroyed by honing to a high degree of sharpness and the edge has a remarkable resistance to abrasion or crumbling or other dulling effects.

One of the primary features of the present alloy is that it has a greater permissible range of hardness while retaining its good cutting characteristics. Another primary feature is that the present alloy enables the use of a higher hardness while avoiding brittleness. For example, one of the best conventional razor blade steels has a 30 N scale of Rockwell hardness of about 79. With this conventional razor blade steel, hardness variations slightly below 79 result in an inferior shave, whereas variations slightly above 79 result in unacceptable brittleness. With the present alloy, greater variations are permissible without adverse effect on the overall characteristics of the razor blades.

The various characteristics referred to throughout the specification vary in importance depending upon the use to which the alloy is put. Practically all these characteristics are important in any form of cutlery and they are particularly important and critical in the form of razor blades and band saws. It has been found that the combination of elements in the critical ranges specified achieves the new and unexpected improved characteristics set forth hereinabove. While the present invention has been disclosed in its preferred form, it will be apparent that variations in the practice of the invention will be possible without departing from the scope thereof, and all such variations are intended to be included within the terms of the following claims.

I claim:

1. A razor blade comprising an alloy steel having the following elements in the approximate percentage ranges:

| | |
|---|---|
| Carbon | 1.35 to 1.50 |
| Chromium | 0.70 to 1.00 |
| Vanadium | 0.30 to 0.45 |
| Silicon | 0.20 to 0.50 |

Remainder iron and incidental impurities.

2. A razor blade comprising an alloy steel having the following elements in the approximate percentage ranges:

| | |
|---|---|
| Carbon | 1.35 to 1.50 |
| Chromium | 0.70 to 1.00 |
| Vanadium | 0.30 to 0.45 |
| Silicon | 0.20 to 0.50 |
| Manganese | 0.25 to 0.40 |

Remainder iron and incidental impurities.

3. A razor blade comprising an alloy steel having the following elements in the approximate percentage ranges:

| | |
|---|---|
| Carbon | 1.35 to 1.50 |
| Chromium | 0.70 to 1.00 |
| Vanadium | 0.30 to 0.45 |
| Silicon | 0.20 to 0.50 |
| Manganese | 0.25 to 0.40 |
| Phosphorous | 0.020 maximum |
| Sulfur | 0.020 maximum |

Remainder iron and incidental impurities.

4. A razor blade comprising an alloy steel having the following elements in the approximate percentage proportions:

| | |
|---|---|
| Carbon | 1.38 |
| Chromium | 0.89 |
| Vanadium | 0.38 |
| Silicon | 0.50 |
| Manganese | 0.32 |

Remainder iron and incidental impurities.

ROBERT L. BALDWIN.

REFERENCES CITED

The following references are of record in the file of this patent:

FOREIGN PATENTS

| Number | Country | Date |
|---|---|---|
| 126,289 | Great Britain | June 10, 1920 |

OTHER REFERENCES

Vanadium Steels and Irons, pages 120 and 122. Published by the Vanadium Corp. of America. Received at the U. S. Patent Office January 4, 1937.